United States Patent
Khan et al.

(10) Patent No.: US 8,778,442 B2
(45) Date of Patent: Jul. 15, 2014

(54) METHOD FOR PREPARING EXTRUDED LEGUME MICRO PELLETS

(75) Inventors: Noman Khan, Carol Stream, IL (US); Sara Wertman, Chicago, IL (US)

(73) Assignee: The Quaker Oats Company, Chicago, IL (US)

( * ) Notice: Subject to any disclaimer, the term of this patent is extended or adjusted under 35 U.S.C. 154(b) by 0 days.

(21) Appl. No.: 13/537,561

(22) Filed: Jun. 29, 2012

(65) Prior Publication Data

US 2013/0022732 A1 Jan. 24, 2013

Related U.S. Application Data

(60) Provisional application No. 61/503,130, filed on Jun. 30, 2011.

(51) Int. Cl.
*A23L 1/20* (2006.01)

(52) U.S. Cl.
USPC .......................... 426/634; 426/455; 426/466

(58) Field of Classification Search
USPC .................................. 426/634, 455, 446
See application file for complete search history.

(56) References Cited

U.S. PATENT DOCUMENTS

| | | | |
|---|---|---|---|
| 2,478,438 A | 8/1949 | Thompson | |
| 3,689,279 A | 9/1972 | Bedenk | |
| 3,708,308 A | 1/1973 | Bedenk | |
| 3,723,131 A | 3/1973 | Bixby | |
| 3,753,728 A | 8/1973 | Bedenk | |
| 3,852,492 A | 12/1974 | Brown, Jr. | |
| 3,891,774 A | 6/1975 | Baker | |
| 3,940,495 A | 2/1976 | Flier | |
| 3,958,032 A | 5/1976 | Merriam | |
| 3,965,268 A | 6/1976 | Stocker | |
| 3,968,269 A | 7/1976 | Payne | |
| 4,022,915 A | 5/1977 | Zukerman | |
| 4,044,157 A | 8/1977 | Wilding | |
| 4,049,840 A | 9/1977 | Reesman | |
| 4,084,016 A | 4/1978 | Kon | |
| 4,124,727 A | 11/1978 | Rockland | |
| 4,162,881 A * | 7/1979 | Morse | 425/331 |
| 4,310,560 A * | 1/1982 | Doster et al. | 426/285 |
| 4,409,250 A | 10/1983 | Van Hulle | |
| 4,490,406 A | 12/1984 | Ferrero | |
| 4,748,037 A | 5/1988 | Matsumoto | |
| 4,869,911 A | 9/1989 | Keller | |
| 4,970,086 A | 11/1990 | Best | |

(Continued)

FOREIGN PATENT DOCUMENTS

| | | |
|---|---|---|
| CA | 2158084 | 3/1996 |
| CA | 2319978 | 3/2002 |
| GB | 2163938 | 3/1986 |

OTHER PUBLICATIONS

International Search Report and Written Opinion for PCT/US2012/044910 mailed Oct. 24, 2012, 10 pages.

*Primary Examiner* — Anthony Weier
(74) *Attorney, Agent, or Firm* — James R. Gourley; Colin P. Cahoon; Carstens & Cahoon, LLP

(57) ABSTRACT

A process for making a highly dense legume micro pellet by preconditioning, extruding, cutting and cooling a legume flour-based mixture. The legume micro pellets made in accordance with the invention contain 70 to 90% legume, have a moisture content of 8 to 12% and a density of 700 to 850 g/L.

5 Claims, 3 Drawing Sheets

(56) References Cited

U.S. PATENT DOCUMENTS

| | | | |
|---|---|---|---|
| 4,976,982 A * | 12/1990 | Gillmore et al. | 426/557 |
| 4,990,348 A | 2/1991 | Spratt | |
| 5,034,232 A | 7/1991 | Sugitani | |
| 5,132,127 A | 7/1992 | Wisdom | |
| 5,176,936 A | 1/1993 | Creighton | |
| 5,183,678 A | 2/1993 | Taga | |
| 5,362,511 A * | 11/1994 | Villagran et al. | 426/549 |
| 5,523,109 A | 6/1996 | Hellweg | |
| 5,725,902 A | 3/1998 | Lesueur-Brymer | |
| 5,744,188 A | 4/1998 | Kolla | |
| 5,747,091 A * | 5/1998 | Denhartog et al. | 426/548 |
| 5,871,801 A | 2/1999 | Kazemzadeh | |
| 5,902,629 A | 5/1999 | Baker | |
| 5,989,620 A * | 11/1999 | Wang et al. | 426/634 |
| 6,022,575 A * | 2/2000 | Lee et al. | 426/557 |
| 6,242,033 B1 | 6/2001 | Sander | |
| 6,274,189 B1 | 8/2001 | Kazemzadeh | |
| 6,287,621 B1 | 9/2001 | Lacourse | |
| 6,303,177 B1 | 10/2001 | Ning | |
| 6,537,604 B1 | 3/2003 | Ethington, Jr. | |
| 6,555,153 B1 | 4/2003 | Keller | |
| 6,607,767 B1 | 8/2003 | Malfait | |
| 6,777,016 B2 | 8/2004 | Thresher | |
| 6,805,888 B2 | 10/2004 | Wu | |
| 6,815,000 B2 | 11/2004 | Kesler | |
| 7,235,276 B2 | 6/2007 | Allen | |
| 7,297,357 B2 | 11/2007 | Akimoto | |
| 7,396,555 B2 | 7/2008 | Baumgartner | |
| 8,277,866 B2 * | 10/2012 | Plattner et al. | 426/618 |
| 2003/0031776 A1 | 2/2003 | Thresher | |
| 2003/0044508 A1 | 3/2003 | Ethington, Jr. | |
| 2003/0064145 A1 | 4/2003 | Fannon | |
| 2003/0134006 A1 | 7/2003 | Chukwu | |
| 2004/0067285 A1 * | 4/2004 | Gimelli | 426/143 |
| 2004/0142081 A1 | 7/2004 | Durand et al. | |
| 2005/0136154 A1 | 6/2005 | Malo | |
| 2005/0153045 A1 | 7/2005 | Johnson | |
| 2005/0233059 A1 | 10/2005 | Harada | |
| 2006/0008563 A1 | 1/2006 | Baumgartner | |
| 2006/0121169 A1 * | 6/2006 | Dowling | 426/557 |
| 2007/0087107 A1 | 4/2007 | Borders | |
| 2007/0092616 A1 | 4/2007 | Witte | |
| 2007/0243301 A1 | 10/2007 | Barnett | |
| 2008/0102165 A1 | 5/2008 | Ning | |
| 2008/0145483 A1 | 6/2008 | Berrios | |
| 2008/0241332 A1 | 10/2008 | Anand | |
| 2008/0248179 A1 | 10/2008 | Anand | |
| 2008/0248180 A1 | 10/2008 | Barnett | |
| 2008/0280020 A1 | 11/2008 | Kugitani | |
| 2009/0155444 A1 | 6/2009 | Yakubu | |
| 2010/0285196 A1 * | 11/2010 | Moore et al. | 426/534 |
| 2011/0086151 A1 * | 4/2011 | Plattner et al. | 426/550 |
| 2011/0183032 A1 * | 7/2011 | Duan et al. | 426/2 |

* cited by examiner

METHOD FOR PREPARING EXTRUDED LEGUME MICRO PELLETS

CROSS-REFERENCE TO RELATED APPLICATIONS

The present application claims priority to U.S. Provisional Application No. 61/503,130, filed Jun. 30, 2011, the disclosure of which is hereby incorporated by reference in its entirety.

FIELD OF THE INVENTION

The present invention relates to a method of preparing highly dense extruded legume micro pellets.

BACKGROUND OF THE INVENTION

In today's society, where heart disease, obesity and high cholesterol are on the rise, consumers are making conscious efforts to reassess their diets and eat healthier. In particular, consumers are seeking out foods that contain higher amounts of protein and grains due to the beneficial health attributes associated with these food groups. As such, a need exists in the food industry for highly nutritious high protein and/or fiber products.

In particular, a need exists in the industry for an intermediate food product that is highly dense and can be easily utilized by a food manufacturer to make a high protein and/or high fiber snack food product.

The United States Department of Agriculture, in its 2010 Dietary Guidelines for American repot specifically identified legumes as a good to encourage for consumption because of its beneficial attributes.

Making a high legume content intermediary product for subsequent popping has been met with challenges, in particular, because of the legumes high susceptibility to gumming during heat processing.

The instant application is directed to an intermediate food product that is highly dense and rich in legumes.

BRIEF SUMMARY OF THE INVENTION

The present invention relates to methods for producing highly dense extruded legume micro pellets. The pellets may be subsequently popped or puffed to make a highly dense legume-based crisp and/or chip. The chips may deliver, for example, at least one half a serving of legumes (15 g) per 30 g serving of chips.

DETAILED DESCRIPTION OF THE INVENTION

The present invention relates to methods for preparing highly dense extruded legume micro pellets. It was discovered that precooking the legumes via extrusion resulted in more effective popping in a pressure puffing system. That is, by pregelatinizing the starch within the legume using extrusion cooking, the starch is in a form that is much more amenable to subsequent popping, even when stored prior to popping.

In accordance with at least one aspect of the invention, legume powder is mixed with other minor ingredients and grain powders and then extruded into micro pellets using a low shear extruder. Examples of extruders that may be used in accordance with the present invention include a Werner Pfleiderer Twin Screw Extruder and a Wenger cold former. The pellets are then dried to a target moisture for popping.

The extruded legume pellet has a high density. In particular, the dried legume pellet has a moisture content of about 8-12%, contains about 70-90% legume, and has a density of about 700-850 g/L.

The legume flour that may be used in accordance with the present includes flour obtained from, without limitation: lentils, chickpeas, kidney beans, lima beans, garbanzo beans, black beans, pinto beans, yellow/green peas and combinations thereof. As used herein "legume" expressly excludes soybean.

The grain flours that may be used in accordance with the present invention include, without limitation, flours obtained from brown rice, corn, wheat, sorghum, millet, oats and combinations thereof. Although whole grains are preferred, any grains or combination of grains may be used in accordance with the instant invention, including refined grain starch sources. "Micro pellet" as used herein means a pellet having a size between about 1.0-6.0 mm in diameter, such as about 2.0-4.0 mm in diameter.

Additionally, a non-grain starch source can be added to micro pellet formulation to increase expansion during popping and increase product integrity/strength, thereby minimizing tendency for breakage in the final packaged snack form. Such sources include, without limitation: potato flour/flakes, potato starch, and tapioca starch.

Figure 1:
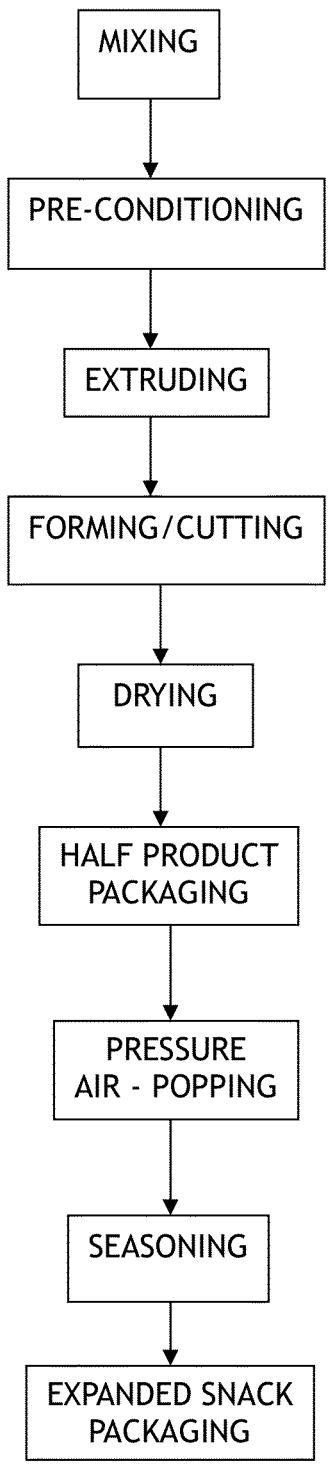
FIG. 1 illustrates one method of preparing highly dense legume micro pellets in accordance with one aspect of the invention.

In one aspect of the preset invention, shown in FIG. 1, ingredients including the legume flour are combined and subjected to mixing. The resulting mixture is then subjected to pre-conditioning in a preconditioner. The preconditioner hydrates, mixes, and partially thermally cooks the flour to form a dough. In the preconditioning step, the flour and water remain in the preconditioner for a residence time of about 1-2 minutes under low shear conditions. Use of the preconditioner reduces the mechanical energy necessitated for full starch gelatinization in the subsequent extrusion process.

Following preconditioning, the hydrated legume mixture is subjected to extruding by immediately introducing the mixture into a twin screw extruder and processing to deliver a specific mechanical energy of 80 to 140 w-h/kg per dry mix basis to the fluid. Additional moisture is added to the mixture to obtain a moisture level of about 25-30%. The barrels of the extruder may be heated incrementally, for example from 200° F. to 320° F., in the direction of flow to raise the dough temperature. The pressure of the extruder may be increased, such as through use of a throttle valve, to 800-1200 psi. The mixture is maintained in the extruder for about 4 minutes at the parameters identified herein, to reach a dough temperature above the gelatinization temperature of the legume starch, such as from about 220° to about 300° F.

After the dough exits the twin extruder, it is subjected to forming and cutting. In particular, it is immediately transferred, via positive displacement through a transfer pipe, to the cold forming, single screw extruder. The dough is compressed, cooled through a water jacketed barrel liner, and conveyed through the extruder to a die assembly at the end of the screw, typically a breaker plate and die. The dough is then cut into micro pellet form.

Lastly, the extruded legume micro pellets are subjected to drying using any suitable apparatus such as a short or pre-dryer and finishing dryer. Dryers may be of a vibratory, rotary, fluidized bed, or conveyor style. After drying, the legume micro pellets are cooled to room temperature on a slow moving conveyor belt or on an air cooling conveyor. The micro pellets may then be packed, for example, without limitation, in an intermediate bulk container or flexible, woven polypropylene super sack, for later processing or routed for immediate processing, such as popping into an expanded snack product.

The legume micro pellet made in accordance with this aspect of the instant invention has a final percent by weight legume content of about 70-90%, for instance about 75-80% legume content.

The micro pellet may be subjected to popping in a pressure puffing machine (rice cake machine), such as a Lite Energy Rice Cake Machine. Alternatively, the legume micro pellets may be stored for up to 12 months prior to use. When and/or if popped the cake made with the extruded legume micro pellets exhibits considerable improvement in texture, cake integrity and taste. After topical seasoning/flavoring of the popped product, the extruded micro pellets may comprise about 70-90% of the finished product composition. The topical season/flavoring of the popped product may be applied in an enrober or any other acceptable means.

In another aspect of the present invention, at least one grain flour is added to the mixture along with the legume flour. For instance, a combination of legume, brown rice, and an additional grain (to functionally provide taste and texture variation) achieves better expansion during the extrusion process, which results in higher individual pellet binding in the cake popping mechanisms. If subsequently popped, this combination results in a more rigid chip versus legume alone or versus legume with a non-rice grain. For example, popped chips formed with legume-only pellets have higher levels of chip breakage out of the popping machine as chips formed with legume and rice micro pellets. It was found that the pellets comprising a blend of grains and legume (chickpea, rice, and corn) formed a more sturdy and crispy chip texture after double compression popping, than a pellet of a single type of grain and legume or legume only.

The composition of the micro pellets made in accordance with the instant invention may include legume and/or grain flour that is partially or fully gelatinized, or combinations thereof.

In another aspect of the present invention, the pellets made in accordance with the invention may be fortified to deliver additional nutritional benefits to the ultimate consumer. These ingredients may include iron, vitamins, tocopherols, calcium, iron, and other minerals and complete proteins, such as soy.

Examples of the extruded micro pellets made in accordance with one aspect of the instant invention are as follows:

| Ingredient | Min Amount Used (% by weight) | Max Amount Used (% by weight) |
|---|---|---|
| Garbanzo Bean/Chickpea flour | 60 | 85 |
| Functional Expansion Grain/Flour (brown rice, potato, tapioca, etc.) | 5 | 25 |
| Functional Taste Grain (corn, wheat, etc.) | 5 | 25 |
| Sugar | 0 | 5 |
| Salt | 0 | 2 |
| Tocopherols | 0 | 0.5 |

The extruded micro pellets above were made in accordance with the steps set forth in the paragraphs above. The pellet ingredients can be blended together prior to adding to the pre-conditioner, or added individually through individual feed systems directly into the pre-conditioner and/or extruder.

The processing parameters used in accordance with this example are set forth in the table below:

| Processing Parameter | Value |
|---|---|
| Dry Mix Rate | 220 lbs/hr |
| Preconditioner Water Rate | 0 lbs/hr |
| Preconditioner Steam Rate | 24 lbs/hr |
| Wet Mix Temperature | 140 F. |
| Extruder Water Rate | 45 lbs/hr |
| Screw Speed | 250 RPM |
| Main Drive AMPS | 40 AMPS |
| Main Drive Power | 7.5 Kw |
| Specific Mechanical Energy | 0.070 kW-hr/lb |
| Extruder Barrel Temperatures | 210-280 F. |
| Dough Temperature | 260-295 F. |
| Dough Pressure | 900 psi |
| Cold Former Temperature | 100 F. |
| Cold Former Pressure | 400 psi |

The specifications of the extruded legume pellets made in accordance with this example are as follows:

| Specification | Min | Max |
|---|---|---|
| Bulk Density (g/512 mL) | 360 | 460 |
| Density (grams per 100 ct) | 2 | 3 |
| Moisture % | 8 | 12 |

One of ordinary skill in the art of the food sciences would recognize that the values identified above will vary depending on grain content and extruder size. Dough temperature and specific mechanical energy are integral to creating the legume micro pellet product and are independent of throughput.

In one exemplary use of the extruded legume pellets of the present invention, a chip comprised of a plurality of extruded legume micro pellets, may contain the formula listed in the table below:

| Ingredient | Min Amount Used (% by weight) | Max Amount Used (% by weight) |
|---|---|---|
| Garbanzo bean/chickpea flour | 48 | 76.5 |
| Functional Expansion Grain/Flour (brown rice, potato, tapioca, etc.) | 4 | 22.5 |
| Functional taste grain | 4 | 22.5 |
| Sugar | 0 | 4.5 |
| Salt | 0 | 1.8 |
| Tocopherols | 0 | 0.45 |
| Oil | 5 | 15 |
| Seasoning | 5 | 15 |

Pellets are coated with a small amount (0.1-1.0%) of sunflower oil prior to popping to reduce sticking in the popper machine. The micro pellets may be expanded using either a pneumatic or hydraulic style popper, depending on the texture desired. Pellets are heated to a temperature of about 400-500° F., such that all material is melted. The popper machine compresses plates to a pressure sufficient to fuse the melted material together for approximately 3-7 seconds. The plates are released to form a base cake of around 2 to 3% moisture.

After popping, the resulting chip can be seasoned using a tumble drum operation of seasoning powder and sprayed oil. Alternatively or additionally, a combination of flavors, species and/or herbs may be added to the pellet composition prior to extrusion, thereby adding flavor to the popped base and enhancing flavor delivery in the finished product to the consumer.

Aspects of the instant invention were tested, and these testing results are as follows:

|  | Scrap <½ Cake | Marginal >½ Cake | Partial 3 Corners | Intact |
|---|---|---|---|---|
| Original - Test 1 | | | | |
| Popping | 4.90% | 8.07% | 13.32% | 73.71% |
| In Enrober (Toting) | — | — | — | — |
| Out Enrober | 8.05% | 10.87% | 17.49% | 63.59% |
| Packaging | 17.65% | 24.87% | 40.72% | 16.76% |
| Original - Test 3 | | | | |
| Popping | 2.18% | 1.61% | 5.70% | 90.52% |
| In Enrober (Toting) | 4.75% | 3.86% | 10.45% | 80.94% |
| Out Enrober | 5.03% | 4.61% | 11.41% | 78.95% |
| Packaging | 15.67% | 9.35% | 19.90% | 55.08% |
| "Economy" - Test 3 | | | | |
| Popping | 2.04% | 1.59% | 3.95% | 92.42% |
| In Enrober (Toting) | 5.07% | 3.72% | 7.35% | 83.86% |
| Out Enrober | 4.29% | 4.14% | 8.58% | 82.99% |
| Packaging | 10.28% | 7.23% | 14.72% | 67.76% |

With respect to the chart above, "scrap" means that less than half of the cake was intact following processing. "Marginal" means that more than half of the cake remained intact following processing. "Partial" means that 3 of the 4 corners of the cake remained intact following processing. The inventors of the instant application found that the integrity of the cakes were greatly improved using the instant method.

The formulas of the samples used in the instant invention can be seen in Table 1 below.

TABLE 1

| | Formula: | |
|---|---|---|
| Ingredient | Original % Mix | Ecomony % Mix |
| GARBANZO BEAN FLOUR | 77.20 | 65.30 |
| WHOLE GRAIN YELLOW CORN FLOUR | 9.00 | 20.00 |
| WHOLE GRAIN BROWN RICE FLOUR | 9.10 | 11.00 |
| SALT - SODIUM CHLORIDE | 1.50 | 0.50 |
| SUGAR | 3.00 | 3.00 |
| NATURAL MIXED TOCOPHEROLS | 0.20 | 0.20 |
| TOTALS: | 100.00 | 100.00 |

Figure 2:
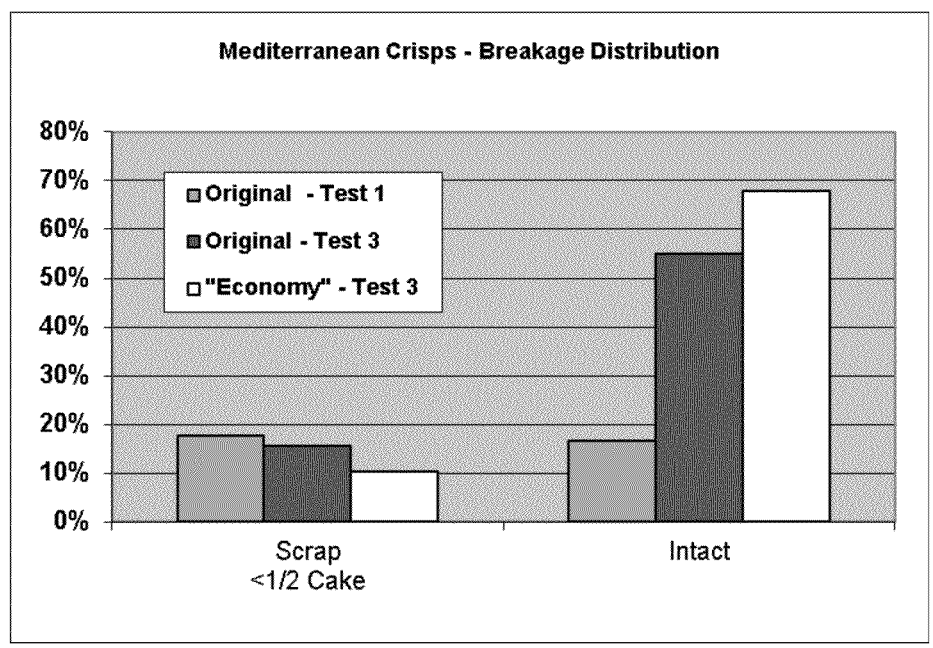
FIG. 2 illustrates the amount of breakage for chips prepared with the micro pellets made in accordance with this invention.
Figure 3:
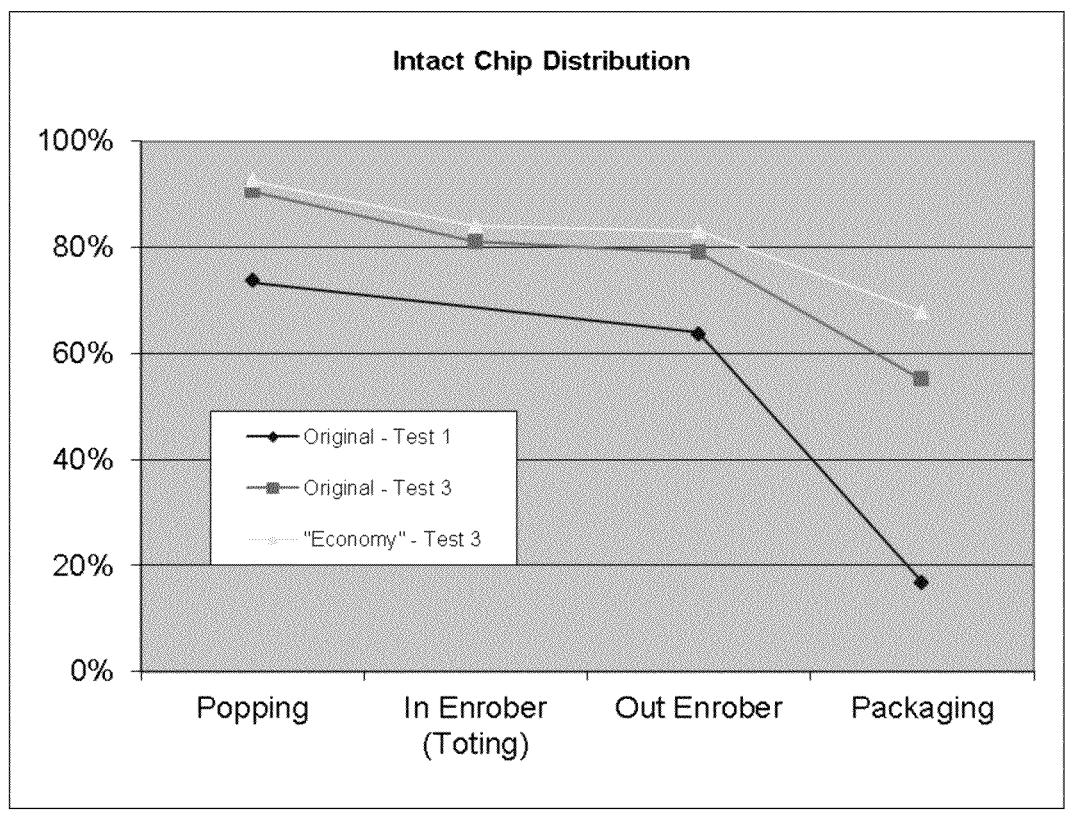
FIG. 3 illustrates the amount of intact chips made with different aspects of the instant invention.

FIG. 2 and FIG. 3 show that the integrity of the cake made in accordance with the instant invention have found that through a combination of the right processing conditions and an optimal formula that has a higher level of functional expansion grain and the amount of broken chips at the end of the manufacturing process were greatly reduced.

The resulting chip had a surprisingly pleasant taste and texture and much improved cake integrity compared to the product made from non-extruded steamed legumes. There is no working knowledge of previous attempts to make highly dense extruded legume micro pellets.

This invention may be embodied in other specific forms without departing from the spirit or essential characteristics thereof. The foregoing embodiments, therefore, are to be considered in all respects illustrative rather than limiting the invention described herein. The scope of the invention is thus indicated by the appended claims, rather than by the foregoing description, and all changes that come within the meaning and range of equivalency of the claims are intended to be embraced therein.

What is claimed is:

1. A method of preparing extruded legume micro pellets comprising the steps of:
   a. introducing a legume flour into a preconditioner;
   b. hydrating and blending the legume flour in the preconditioner to form a hydrated legume mixture;
   c. introducing the hydrated legume mixture to an extruder and applying a specific mechanical energy of about 80-140 w-h/kg per dry mix basis to the hydrated legume mixture;
   d. adding additional moisture if necessary to obtain a moisture level of about 25-30% for the hydrated legume mixture;
   e. maintaining the hydrated legume mixture in the extruder for about 4 minutes to form a legume dough;
   f. forcing the legume dough to exit the extruder;
   g. transferring the legume dough to a cold forming extruder;
   h. compressing the dough and then cooling the dough through a water jacked barrel liner;
   i. forcing the dough through a die assembly at the end of the extruder;
   j. cutting the legume dough to form a legume micro pellet; and
   k. drying the legume micro pellet.

2. The process of claim 1 further comprising the step of popping a plurality of legume micro pellets in a rice cake popping machine.

3. The process of claim 1 wherein the legume flour is selected from the group consisting of lentil, chickpea, kidney bean, lima bean, garbanzo bean, black bean, pinto bean, yellow/green pea and combinations thereof.

4. The process of claim 1 further comprising adding at least one grain flour to the legume flour in the preconditioner.

5. The process of claim 4 wherein the at least one grain flour is selected from the group consisting of brown rice, white rice, corn, wheat, sorghum, millet, oats, and combinations thereof.

\* \* \* \* \*